United States Patent [19]
Menten

[11] Patent Number: 5,645,352
[45] Date of Patent: Jul. 8, 1997

[54] CIRCUIT CONFIGURATION AND METHOD FOR ASCERTAINING THE TEMPERATURE OF A CURRENT-REGULATED ELECTRICAL COIL

[75] Inventor: Frank Menten, Regensburg, Germany

[73] Assignee: Siemens Aktiengesellschaft, Munich, Germany

[21] Appl. No.: 281,482

[22] Filed: Jul. 27, 1994

[30] Foreign Application Priority Data

Jul. 27, 1993 [EP] European Pat. Off. .............. 93112002

[51] Int. Cl.$^6$ ...................................................... G01K 7/00
[52] U.S. Cl. ............................................. 374/183; 361/161
[58] Field of Search ..................................... 374/152, 172, 374/173, 183; 361/161; 364/557

[56] References Cited

U.S. PATENT DOCUMENTS

| | | | |
|---|---|---|---|
| 4,602,872 | 7/1986 | Emery et al. ............................ | 374/152 |
| 4,770,264 | 9/1988 | Wright et al. . | |
| 4,897,584 | 1/1990 | Grutzmacher et al. .................. | 318/471 |
| 5,046,859 | 9/1991 | Yamaguchi ............................. | 374/185 |
| 5,083,273 | 1/1992 | Nishiwaki et al. ..................... | 364/424.1 |
| 5,371,469 | 12/1994 | Anderson ............................... | 324/705 |

FOREIGN PATENT DOCUMENTS

| | | |
|---|---|---|
| 0192373 | 8/1986 | European Pat. Off. . |
| 3240153 | 5/1984 | Germany . |
| 8910865 | 11/1989 | WIPO . |

OTHER PUBLICATIONS

Patent Abstracts of Japan, vol. 7, No. 150 (P–297)[1295] Jun. 30, 1983 & JP–A–58 061 432 (Tokyo) Apr. 12, 1983.
Patent Abstracts of Japan, vol. 7, No. 234 (P–230)[1379] Oct. 18, 1983 & JP–A–58–121 418 (Matsushita) Jul. 1983.
Patent Abstracts of Japan, vol. 7, No. 234 (P–230)[1379] Oct. 18, 1983 & JP–A–58–121 419 (Matsushita) Jul. 1983.

*Primary Examiner*—George M. Dombroske
*Assistant Examiner*—Paul D. Amrozowicz
*Attorney, Agent, or Firm*—Herbert L. Lerner; Laurence A. Greenberg

[57] ABSTRACT

A circuit configuration and method for ascertaining the temperature of a current-regulated electric coil, in particular the coil of an electromagnetic proportional valve of a hydraulic regulating device, by measurement of an ohmic resistance of a winding of the coil, includes a coil current circuit in which the coil and other resistances are connected. A control and evaluation circuit is connected to the coil current circuit and has a pulse-width modulated regulating signal for regulating a mean current through the coil. A temperature sensor is connected to the control and evaluation circuit. The control and evaluation circuit ascertains a correction value once the temperature of the coil has been aligned with the temperature of the temperature sensor, taking into account an influence of interference of the other resistances in the coil current circuit upon the temperature thereof. The temperature of the coil is calculated from a supply voltage to the coil, a pulse-interval ratio of the coil current, and the coil current itself, taking the correction value into account.

8 Claims, 1 Drawing Sheet

CIRCUIT CONFIGURATION AND METHOD FOR ASCERTAINING THE TEMPERATURE OF A CURRENT-REGULATED ELECTRICAL COIL

BACKGROUND OF THE INVENTION

Field of the Invention

The invention relates to a circuit configuration and a method for ascertaining the temperature of a current-regulated electric coil, in particular the coil of an electromagnetic proportional valve of a hydraulic regulating device, by measurement of the ohmic resistance of the coil winding. The circuit configuration and method serve to ascertain the temperature, for instance of the coil of an electromagnetic proportional valve in a hydraulic regulating device as is used, for instance, in motor vehicle steering systems.

A rear axle steering system which is known from U.S. Pat. No. 4,770,264 includes such a regulating device with a hydraulic actuator or final control element that has a hydraulic operating cylinder and an electrically actuated control valve or proportional valve which determines the flow of fluid to the operating cylinder. It also includes an electronic control unit, by which the signals furnished by various sensors in the motor vehicle are evaluated and control signals for the final control element are generated. An electronic control unit, which is also known from Published International Application WO 89/10865, has the object of regulating the location of the operating cylinder piston in a rear axle steering system.

The oil throughput quantities inside the components of a hydraulic final control element are dependent on viscosity and therefore on temperature. The nominal throughput values are not attained, particularly at low temperatures. One consequence thereof is that the control deviation and the positional accuracy of the regulating system become worse at low temperatures. In order to take the temperature dependency of the positional regulation into account, one can measure the temperature of the final control element, which is an approximate measure for the temperature of the hydraulic oil, with its own temperature sensor. Such a sensor and the connections required for it represent an expense which is not inconsiderable.

However, it is also known in a control system for an automatic motor vehicle transmission disclosed by German Published, Non-Prosecuted Application DE 32 40 153 A1, to determine the temperature from the temperature-dependently variable electric resistance of some transmission element. However, it has been found that the accuracy of temperature ascertainment depends not only on the temperature of the coil, and therefore on the coil resistance, as well as on the supply of voltage to the coil, but also on the total electrical resistance of the coil current circuit. That resistance depends on the other resistances, such as junction resistances, line resistances, and so forth, which taken all in all cause a temperature offset that differs from one current circuit to another and falsifies the ascertained temperature value. Although it is possible to integrate a temperature sensor directly into the coil, nevertheless because of the difficulty of securing it, the requisite lines to be extended out of the coil and the requisite plug contacts, it is very expensive and also very vulnerable to malfunction.

SUMMARY OF THE INVENTION

It is accordingly an object of the invention to provide a circuit configuration and a method for ascertaining the temperature of a current-regulated electrical coil, which overcome the hereinafore-mentioned disadvantages of the heretofore-known devices and methods of this general type and which determine the temperature of a current-regulated electrical coil accurately, without having to mount a temperature sensor on the coil.

With the foregoing and other objects in view there is provided, in accordance with the invention, in a circuit configuration for ascertaining the temperature of a current-regulated electric coil, in particular the coil of an electromagnetic proportional valve of a hydraulic regulating device, by measurement of an ohmic resistance of a winding of the coil, the improvement comprising a coil current circuit in which the coil and other resistances are connected; a control and evaluation circuit being connected to the coil current circuit and having a pulse-width modulated regulating signal for regulating a mean current through the coil; a temperature sensor connected to the control and evaluation circuit; the control and evaluation circuit ascertaining a correction value once the temperature of the coil has been aligned with the temperature of the temperature sensor, taking into account an influence of interference of the other resistances in the coil current circuit upon the temperature thereof; and the temperature of the coil being calculated from a supply voltage to the coil, a pulse-interval ratio of the coil current, and the coil current itself, taking the correction value into account.

In accordance with another feature of the invention, the control and evaluation circuit is a microprocessor ascertaining a voltage drop in the coil current circuit and outputting the pulse-width modulated regulating signal affecting the regulation of the coil current.

In accordance with a further feature of the invention, the other resistances include a power switch connected in the coil current circuit for receiving the pulse width modulated regulating signal.

In accordance with an added feature of the invention, there is provided a control unit connected to the coil, the temperature sensor being disposed in the control unit.

In accordance with an additional feature of the invention, the microprocessor has a diagnostic input, and there is provided a computer connected to the diagnostic input for tripping the ascertainment of the temperature correction value by the microprocessor.

With the objects of the invention in view, there is also provided, in a method for ascertaining the temperature of a current-regulated electrical coil, in particular the coil of an electromagnetic proportional valve of a hydraulic regulating device, in which an ohmic resistance of the coil winding is measured, the improvement which comprises regulating a mean current through the coil with a pulse-width modulated regulating signal; aligning the temperature of the coil with the temperature of a temperature sensor and then ascertaining a correction value taking into account an interfering influence of other resistances in a coil current circuit upon its temperature; and calculating the temperature of the coil from a supply voltage to the coil, a pulse-interval ratio of the coil current, and the coil current itself, taking the correction value into account.

One advantage of the circuit configuration of the invention is in particular that it is reliable and not very vulnerable to malfunction.

Other features which are considered as characteristic for the invention are set forth in the appended claims.

Although the invention is illustrated and described herein as embodied in a circuit configuration and a method for ascertaining the temperature of a current-regulated electrical coil, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
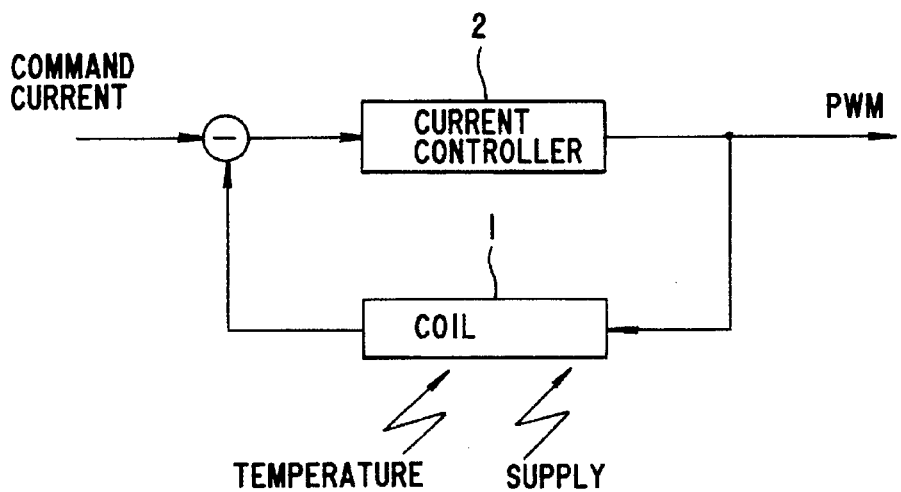
FIG. 1 is a block circuit diagram of a closed-loop control circuit, with which a current flowing through a coil of an electromagnet is regulated.

Referring now to the figures of the drawing in detail and first, particularly, to FIG. 1 thereof, there is seen a conventional closed-loop control circuit in which an electric current that flows through a coil 1, for instance the coil of an electromagnetic proportional valve, is regulated with a current controller 2. The current controller 2 receives an input signal which is a control deviation, or in other words the difference between a command or set point current and an actual current. The current controller 2 supplies an output signal which is a regulating signal PWM in the form of a pulse-width modulated signal, that regulates a coil current $I_{Coil}$.

A pulse-interval ratio ppv of the regulating signal is definitive for the magnitude of the coil current.

The temperature of the coil 1, as well as the supply voltage to the coil 1 because of the temperature dependency of the ohmic resistance of the metal coil material, are interference variables of the closed-loop control circuit, which definitively influence the magnitude of the electric current in the coil.

Figure 2:
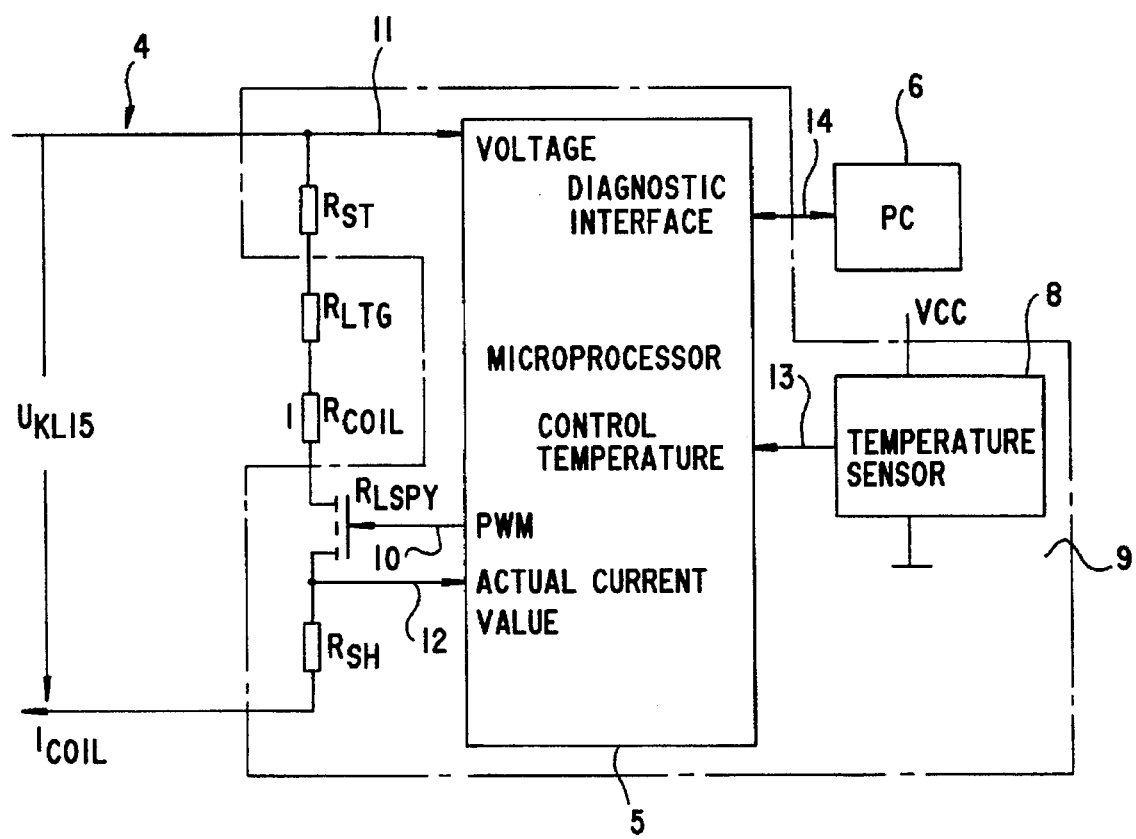
FIG. 2 is a schematic and block circuit diagram of an exemplary embodiment of the circuit configuration of the invention.

A circuit configuration for regulating an electric current flowing through a coil 1 includes a coil current circuit 4 and a microprocessor 5 acting as a current controller, which are shown in FIG. 2. In order to carry out a temperature calibration to be described below, or in other words in order to ascertain a correction value for the coil temperature, a computer 6, for instance in the form of a personal computer PC, and a temperature sensor 8. are used. The temperature sensor is contained in a control unit 9, which is only schematically shown herein by a dot-dashed line. The control unit 9 also includes the microprocessor 5 and components identified by resistances $R_{ST}$, $R_{SH}$ and $R_{LSPV}$. The control unit 9 serves, for instance, to control an automatic transmission, rear axle steering or some other system in a motor vehicle.

The coil current circuit 4 includes the following elements that have resistance and are represented herein and in the drawing by their ohmic resistance: a safety transistor having the resistance $R_{ST}$, an electric line with a line resistance $R_{LTG}$, the coil 1 with a resistance $R_{Coil}$, a line switch with the resistance $R_{LSPV}$, and a shunt resistance which is used for ascertaining the actual current and has the resistance $R_{SH}$. The power switch having the resistance $R_{LSPV}$ is supplied over a line 10 with a regulating signal that is output at an output PWM of the microprocessor 5. This regulating signal is pulse-width modulated, it contains the control information in the form of its pulse-interval ratio ppv, and it regulates the actual current $I_{Coil}$ in the coil current circuit 4.

A so-called KL15 voltage, that is the voltage $U_{KL15}$ of the vehicle battery, which voltage is present in any case in the control unit 9, serves as the supply voltage for the coil current circuit 4. This voltage is delivered over a line 11 to a first analog/digital input of the microprocessor 5, and the actual current value in the coil current circuit 4 travels over a line 12 to reach a second analog/digital input of the microprocessor 5.

The other resistances of the current coil circuit 4, in other words its resistances except for the coil resistance itself, are summarized as follows:

$$\Sigma R_{other} = R_{LSPV} + R_{LTG} + R_{SH} + ST \quad (1)$$

The actual current $I_{Coil}$ through the coil 1 can be calculated as follows:

$$I_{Coil} = k * ppv * \frac{U_{KL15}}{R_{Coil(293K)}*[1+\alpha*(T_{Coil}-273K)] + \Sigma R_{other}} \quad (2)$$

and from this, by conversion, the coil temperature is obtained as follows:

$$T_{Coil} = k * ppv * \frac{U_{KL15}}{I_{Coil}*R_{Coil(293K)}*\alpha} - \frac{\Sigma R_{other}}{R_{Coil(293K)}*\alpha} - \frac{1}{\alpha} + 273K \quad (3)$$

The symbols used in the equations above and in the equations below are as follows:

$\alpha$ temperature coefficient of copper
$I_{Coil}$ actual current (mean current) through the coil 1
k proportionality factor (0.9 ... 1.3)
ppv pulse-interval ratio
$R_{SH}$ shunt for ascertaining actual current
$R_{ST}$ safety transistor resistance
$R_{LTG}$ line resistor
$R_{LSPV}$ resistance of the power switch
$R_{Coil(293k)}$ resistance of the coil 1 at 293K
$\Sigma R_{other}$ sum of other resistances in coil current circuit
$T_{Coil}$ coil temperature
$T_{SG}$ temperature of the control unit 9
TA correction value for temperature of the coil 1
$U_{KL15}$ supply voltage (of the coil 4)

It can be seen from equation (3) that the accuracy of temperature detection is definitively dependent on the electrical $\Sigma R_{other}$. This sum causes a temperature offset or in other resistance of the coil current circuit 4, or in other words particularly on the sum of all of the other resistances words a falsification of the ascertained temperature value, which differs from one coil circuit to another.

In order to compensate for this falsification, calibration is carried out with the aid of the temperature sensor 8 contained in the control unit 9. In other words, a correction value TA for the coil temperature is ascertained. A voltage value furnished by the temperature sensor 8 is delivered over a line 13 to a third analog/digital input of the microprocessor 5. This temperature calibration is tripped by the computer 6, specifically through a diagnostic interface of the microprocessor 5, with which it is connected over a line 14. Prior to the calibration or in other words the ascertainment of the correction temperature value TA, care must be taken to ensure that the control unit 9 and the coil 1 have the same temperature. Since the control unit 9 and the coil 1 are located closely to each other, if they are not already at the same temperature, it will only take a short time until their temperatures equalize. Then the following equation applies for the correction value TA:

$$TA = T_{SG} - k * ppv * \frac{U_{KL15}}{I_{Coil} * R_{Coil(293K)} * \alpha} \quad (4)$$

Thus, the correction value TA corresponds to the quantity $$-\frac{\Sigma R_{other}}{R_{coil(293K)} * \alpha} - \frac{1}{\alpha} + 273K$$

shown in equation (3). Equation (4) relates only to the case wherein the coil temperature is equal to the control device temperature (i.e., $T_{coil}=T_{SG}$, or $T_{winding}=T_{SG}$). Naturally, during normal operation, this is not true, and for this reason, the correction value TA is required.

From this, the following is obtained:

$$T_{Coil} = k * ppv * \frac{U_{KL15}}{I_{Coil} * R_{Coil(293K)} * \alpha} + TA \quad (5)$$

Once the temperature value TA has been ascertained, the temperature of the correction coil 1 can then be ascertained exactly at any time and continuously by the microprocessor 5, from the measured values it receives and from the variables known to it. If after some time, especially at a low coil resistance, the resistance in the coil current circuit changes, for instance due to aging of plug contacts, then the measurement accuracy of the current configuration according to the invention can be restored in a simple way by reascertainment of the correction value TA.

I claim:

1. In a circuit configuration for ascertaining the temperature of a current-regulated electric coil having a winding, by measurement of an ohmic resistance of the winding, the improvement comprising:

a coil current circuit in which the coil and other resistances are connected;

a control and evaluation circuit being connected to said coil current circuit and having a pulse-width modulated regulating signal for regulating a mean current through the coil;

a temperature sensor connected to said control and evaluation circuit;

said control and evaluation circuit ascertaining a correction value once the temperature of the coil has been aligned with the temperature of said temperature sensor, taking into account an influence of interference of said other resistances in said coil current circuit upon the temperature thereof; and the temperature of the coil being calculated from a supply voltage to the coil, a pulse-interval ratio of the coil current, and the coil current itself, taking the correction value into account.

2. The circuit configuration according to claim 1, wherein said control and evaluation circuit is a microprocessor ascertaining a voltage drop in said coil current circuit and outputting the pulse-width modulated regulating signal affecting the regulation of the coil current.

3. The circuit configuration according to claim 2, wherein said other resistances include a power switch connected in the coil current circuit for receiving the pulse width modulated regulating signal.

4. The circuit configuration according to claim 1, including a control unit connected to the coil, said temperature sensor being disposed in said control unit.

5. The circuit configuration according to claim 2, wherein said microprocessor has a diagnostic input, and including a computer connected to the diagnostic input for tripping the ascertainment of the temperature correction value by said microprocessor.

6. In a circuit configuration for ascertaining the temperature of a current-regulated electric coil of an electromagnetic proportional valve of a hydraulic regulating device, by measurement of an ohmic resistance of a winding of the coil, the improvement comprising:

a coil current circuit in which the coil and other resistances are connected;

a control and evaluation circuit being connected to said coil current circuit and having a pulse-width modulated regulating signal for regulating a mean current through the coil;

a temperature sensor connected to said control and evaluation circuit;

said control and evaluation circuit ascertaining a correction value once the temperature of the coil has been aligned with the temperature of said temperature sensor, taking into account an influence of interference of said other resistances in said coil current circuit upon the temperature thereof; and the temperature of the coil being calculated from a supply voltage to the coil, a pulse-interval ratio of the coil current, and the coil current itself, taking the correction value into account.

7. In a method for ascertaining the temperature of a current-regulated electrical coil, in which an ohmic resistance of a winding of the coil is measured, the improvement which comprises:

regulating a mean current through the coil with a pulse-width modulated regulating signal;

aligning the temperature of the coil with the temperature of a temperature sensor and then ascertaining a correction value taking into account an interfering influence of other resistances in a coil current circuit upon its temperature; and calculating the temperature of the coil from a supply voltage to the coil, a pulse-interval ratio of the coil current, and the coil current itself, taking the correction value into account.

8. In a method for ascertaining the temperature of a current-regulated electrical coil of an electromagnetic proportional valve of a hydraulic regulating device, in which an ohmic resistance of the coil winding is measured, the improvement which comprises:

regulating a mean current through the coil with a pulse-width modulated regulating signal;

aligning the temperature of the coil with the temperature of a temperature sensor and then ascertaining a correction value taking into account an interfering influence of other resistances in a coil current circuit upon its temperature; and calculating the temperature of the coil from a supply voltage to the coil, a pulse-interval ratio of the coil current, and the coil current itself, taking the correction value into account.

* * * * *